Patented Aug. 31, 1954

2,687,974

UNITED STATES PATENT OFFICE 2,687,974

PREPARATION OF CALCIUM SULFATE/ZINC SULFIDE PIGMENT

Herbert Mills, Liverpool, and Harold Ford, Widnes, England, assignors to Orr's Zinc White Limited, London, England No Drawing. Application October 18, 1949, Serial No. 122,143

Claims priority, application Great Britain October 21, 1948

2 Claims. (Cl. 106—293)

This invention relates to the preparation of composite calcium sulphate/zinc sulphide pigments. We have discovered that it is necessary to exclude or to eliminate the traces of calcium sulphide from the final product if a satisfactory paint is to be prepared from the pigment.

The pigments are prepared by reacting zinc sulphate and calcium hydrosulphide and calcining the product. The zinc sulphate and calcium hydrosulphide react to form a composite co-precipitated mixture of molecules of zinc sulphide and calcium sulphate and the gas hydrogen sulphide ($H_2S$), some of which is liberated from the slurry leaving the slurry saturated with the gas.

We prefer to ensure the exclusion of calcium sulphide by manufacturing the pigments according to the first method described in our co-pending application Serial No. 122,141 filed October 18, 1949, namely, by adding to the co-precipitate slurry a small portion of zinc sulphate followed after a short interval by calcium carbonate slurry to neutrality, alternate additions of zinc sulphate and calcium carbonate being made until hydrogen sulphide is eliminated, and then adding an excess of zinc sulphate to the substantially hydrogen sulphide-free and neutral slurry, or according to the first method described in our co-pending application Serial No. 122,142 filed October 18, 1949, namely, by admitting a controlled amount of air during calcining, or by a combination of both of these methods.

In instances where the adoption of our preferred method or methods is not practicable we proceed according to the ordinary process of preparing the pigment by the methods of co-precipitation and calcining as is well known in the art.

We have found that by the adoption of these well known methods the pigments produced by the calcining operation will contain a proportion of the objectionable substance, a water-soluble calcium sulphide.

According to the manner of our invention, we then apply the final method described in our co-pending applications Serial No. 122,141 and Serial No. 122,142, both filed October 18, 1949. Thus we first quench the calcined powder with water and therewith form a water slurry. To this slurry we add sulphuric acid or other mineral acid until the slurry reacts acid to an indicator preferably methyl orange or to a pH indicating meter. Thereafter the slurry is washed, dried and ground according to the ordinary practice in the art.

We claim:

1. In the method of preparing calcium sulphate-zinc sulphide white pigment substantially free from calcium sulphide in which a composite co-precipitate of calcium sulphate and zinc sulphide is formed, the co-precipitate is calcined, thereby forming a non-acid calcined product containing traces of calcium sulphide, and the calcined product is quenched in water to form a slurry; the improvement which comprises removing the traces of calcium sulphide by adding a sufficient amount of a mineral acid to said slurry to render it acid to an indicator.

2. In the method of preparing a calcium sulphate-zinc sulphide white pigment as defined in claim 1 in which the mineral acid is sulphuric acid.

References Cited in the file of this patent

UNITED STATES PATENTS

| Number | Name | Date |
|---|---|---|
| 1,540,456 | Booge | June 2, 1925 |
| 1,617,311 | Booge | Feb. 8, 1927 |
| 1,619,376 | Schanche | Mar. 1, 1927 |
| 1,886,165 | Christensen | Nov. 1, 1932 |
| 1,889,130 | Patterson | Nov. 29, 1932 |
| 1,977,583 | Hanahan | Oct. 16, 1934 |
| 2,016,537 | Booge | Oct. 8, 1935 |
| 2,112,357 | Butler et al. | Mar. 29, 1938 |
| 2,123,698 | Hanahan et al. | July 12, 1938 |

OTHER REFERENCES

"Comprehensive Treatise on Inorganic and Theoretical Chemistry," Mellor, vol. 3; Longmans, Green & Co., London, 1933; pp. 744 and 645.